United States Patent [19]

Bauriedel

[11] Patent Number: 4,623,709

[45] Date of Patent: Nov. 18, 1986

[54] ADHESIVES BASED ON POLYURETHANE PREPOLYMERS HAVING A LOW RESIDUAL MONOMER CONTENT

[75] Inventor: Hans Bauriedel, Duesseldorf, Fed. Rep. of Germany

[73] Assignee: Henkel Kommanditgesellschaft auf Aktien, Duesseldorf, Fed. Rep. of Germany

[21] Appl. No.: 690,788

[22] Filed: Jan. 11, 1985

[30] Foreign Application Priority Data

Jan. 14, 1984 [DE] Fed. Rep. of Germany ....... 3401129

[51] Int. Cl.$^4$ .................. C08G 18/10; C08G 18/32; C08G 18/75
[52] U.S. Cl. ........................ 528/65; 528/44; 528/59; 528/67
[58] Field of Search .................. 528/44, 59, 65, 67

[56] References Cited

U.S. PATENT DOCUMENTS

| | | | |
|---|---|---|---|
| 2,901,467 | 8/1959 | Croco | 260/77.5 |
| 3,384,624 | 5/1968 | Heiss | 260/77.5 |
| 3,933,725 | 1/1976 | Dearlove et al. | 260/33.6 WB |
| 4,061,662 | 12/1977 | Marans et al. | 560/26 |
| 4,111,865 | 9/1978 | Seefried | 521/137 |
| 4,247,676 | 1/1981 | Kimball | 528/49 |
| 4,373,082 | 2/1983 | Kimball et al. | 528/60 |
| 4,385,171 | 5/1983 | Schnabel et al. | 528/491 |
| 4,395,530 | 7/1983 | Hammond | 528/48 |
| 4,413,111 | 11/1983 | Markusch et al. | 528/59 |
| 4,487,910 | 12/1984 | Bauriedel | 528/65 |

OTHER PUBLICATIONS

H. G. Elias, "Makromolekuele", Huthig & Wepf, Basel, 4th Edition 1981, pp. 487, et seq.

*Primary Examiner*—Herbert S. Cockeram
*Attorney, Agent, or Firm*—Ernest G. Szoke; Mark A. Greenfield

[57] ABSTRACT

Polyurethane prepolymers in which polyhydric alcohols are initially reacted with the faster reacting isocyanate group of an asymmetrical diisocyanate with the slowly reacting group remaining intact, after which the reaction products are combined with a symmetrical diisocyanate of which the equally reactive isocyanate groups again react more quickly than the slowly reacting groups of the first polyfunctional isocyanate compound. The products obtained by this process are distinguished by a low residual monomer content.

26 Claims, No Drawings

ADHESIVES BASED ON POLYURETHANE PREPOLYMERS HAVING A LOW RESIDUAL MONOMER CONTENT

BACKGROUND OF THE INVENTION

1. Field of the Invention

This invention relates to isocyanate-terminated polyurethane prepolymers based on isocyanates of different reactivity, and a process for their production. The products obtained by this process are distinguished by their reduced content of free monomeric diisocyanates.

2. Statement of the Related Art

Isocyanate-terminated polyurethane prepolymers have long been known. They may be readily reacted with suitable hardeners, generally polyhydric alcohols, to form high polymers. Polyurethane prepolymers have acquired significance in numerous fields, including sealing compounds, lacquers and adhesives.

To obtain isocyanate-terminated polyurethane prepolymers, it is standard practice to react polyhydric alcohols with an excess of diisocyanates. As is generally known among people skilled in the field of polymer chemistry, the average molecular weight can be controlled at least approximately through the ratio of hydroxyl groups to isocyanate groups in this reaction. Thus, products of very high molecular weight are formed where the molar ratio in question is exactly 1:1, whereas lower molecular weight adducts of 2 molecules of diisocyanate with 1 molecule of diol are formed on a statistical average where the molar OH:NCO ratio is 1:2. On the strength of this knowledge, it is possible for one to "tailor" isocyanate-terminated polyurethane prepolymers having molecular weights variable over wide limits. However, the products formed, like most polymers, have a more or less wide molecular weight distribution. In particular, a certain quantity of the component used in excess is left over unreacted on completion of the reaction, irrespective of the reaction time. The content of unreacted diisocyanates (hereinafter referred to as residual monomers) increases with the excess of that component in the reaction mixture (cf. H. G. Elias, "Makromoleküle", Huthig & Wepf, Basel, 4th Edition 1981, pages 487, et seq.).

In numerous applications of polyurethane prepolymers, problems are presented by the presence of residual monomers. Thus, volatile diisocyanate monomers such as tolylene diisocyanate necessitate special precautionary measures concerned with industrial safety, even if they are present in the prepolymers in quantities of only 0.5 to 5% by weight. On the other hand, involatile excess diisocyanates can give rise to problems through migration in polyurethane adhesives. The problems in question can arise, for example, in the sealing of bonded laminates.

To reduce the content of residual monomers, it has been proposed in earlier filed copending German Patent Application P No. 33 06 559.4, and corresponding U.S. Pat. No. 4,487,910 to prepare a low viscosity polyurethane prepolymer from a monocyclic diisocyanate and a polyhydric alcohol and to react a dicyclic diisocyanate with an alcohol component in that polyurethane prepolymer as solvent or reactive diluent. Although low-monomer polyurethane prepolymers can be obtained by that process, it is nevertheless desirable to have products which combine a low residual monomer content with a low viscosity.

DESCRIPTION OF THE INVENTION

Other than in the operating examples, or where otherwise indicated, all numbers expressing quantities of ingredients or reaction conditions used herein are to be understood as modified in all instances by the term "about".

The present invention affords a process for the production of isocyanate terminated polyurethane prepolymers as well as the products of that process.

The process may be summarized as follows:

in a first reaction step, a first category of isocyanate which is a diisocyanate having isocyanate moieties of differing reactivity is reacted with a polyhydric alcohol in an OH:NCO ratio of 0.55–4:1 until virtually all of the faster-reacting of the two isocyanate moieties have been reacted with OH moieties, forming a first stage prepolymer having a substantial number of free OH moieties attached through the alcohol nucleus; and in a second reaction step, a second category of isocyanate which has at least one isocyanate moiety which is more reactive than the less reactive isocyanate moiety of the first category, and which is preferably also a diisocyanate, is reacted with the remaining (free) OH moieties of the first stage prepolymer, in an equimolar quantity or in slight excess of isocyanate to those remaining (free) OH moieties.

The reactions are conducted, if desired, in the presence of known catalysts and/or at elevated temperatures, and result in a polyurethane prepolymer having a very low residual isocyanate monomer content.

The present invention also includes the use of the products obtained by this process when combined with the usual hardeners and/or moisture, and optionally in the presence of organic solvents and standard accelerators, for bonding plastics, particularly in the form of films.

A theoretical explanation of this invention, which is not intended as limiting, is based on the observation that, in the reaction of diisocyanates with alcohols, the first isocyanate moiety reacts considerably more quickly than the second isocyanate moiety. This applies in particular to monocyclic diisocyanates and also to other diisocyanates containing moieties in different chemical configurations, i.e. generally speaking to asymmetrical diisocyanates. It has also been found that dicyclic diisocyanates or, more generally, symmetrical diisocyanates have a higher reaction velocity than the abovementioned second isocyanate moieties of asymmetrical or monocyclic diisocyanates.

In addition, it is known that isocyanate-terminated polyurethane prepolymers have a comparatively low viscosity when they are derived from a diisocyanate containing NCO moieties of differing reactivity, for example from an asymmetrical monocyclic diisocyanate.

According to the invention, a polyhydric alcohol is reacted with an equivalent quantity or with an excess of a monocyclic diisocyanate (i.e. first category of isocyanate) in a first reaction step until the more reactive NCO moieties of the diisocyanate have reacted almost completely with some of the available OH moieties without the less reactive NCO moieties having reacted to any significant extent, if at all. This point of the reaction may be determined by analytically following the course of the reaction. The course of the reaction may be followed by spectroscopy (IR) or titrimetry. The molar ratios used in the process according to the invention are selected in such a way that free OH moieties are still present after the more reactive isocyanate moieties have reacted.

In the second stage of the reaction, a second class of symmetrical dicyclic diisocyanate is added to the low-viscosity reaction mixture obtained in the first stage of the reaction. This dicyclic diisocyanate is selected so that its reactivity is higher than that of the polymer-bound unreacted NCO-groups of the first class of asymmetrical monocyclic diisocyanate.

In other terms, it may be said that, according to the teaching of this invention, a low-viscosity reaction product medium containing OH-functional and NCO-functional moieties is used to carry out a reaction between its OH-functional moieties and a symmetrical diisocyanate, to form a polyurethane prepolymer having a low residual monomer content.

The use of a diisocyanate having clearly graduated reactivity in the process according to the invention ensures that the product of the first reaction step may be used as a reactive diluent without any substantial reaction taking place between its free OH moieties and the slowly reacting (i.e. remaining) polymer-bound NCO moieties of the monocyclic diisocyanate.

Since, on the one hand, the residual monomer content of the reactive diluent (i.e. first stage prepolymer) decreases further during the second stage of the reaction, because the monocyclic diisocyanates present as residual monomer in the reactive diluent contain isocyanate groups of higher reactivity than the reactive diluent itself, and since on the other hand relatively high molecular weight prepolymers having a low residual monomer content, which could not be further processed without the reactive diluent, can be produced in the second stage of the reaction, prepolymer mixtures having a greatly reduced residual monomer content are obtained overall.

Stated in its broadest terms, the minimum requirement for the first category of isocyanate is that two isocyanate moieties of differing reactivity are present. The more reactive isocyanate moiety substantially reacts with one of the hydroxy moieties of the polyol in the first stage of the prepolymer reaction, leaving an unreacted (mostly the less reactive) isocyanate moiety and an unreacted hydroxy moiety on the first stage prepolymer. Therefore, also stated in its broadest terms, the minimum requirement for the second category of isocyanate, which is reacted with the first stage prepolymer, is that it has at least one isocyanate moiety which is more reactive than the remaining (unreacted) isocyanate moiety of the first category of isocyanate, so that it preferentially reacts with the free OH moiety of the first stage prepolymer.

For the first category of isocyanate, asymmetric monocyclic, aromatic and/or aliphatic diisocyanates are particularly suitable for carrying out the process according to the invention. Tolylene diisocyanate, especially tolylene-2,4 diisocyanate (TDI) is of considerable commercial significance and is a suitable aromatic compound while isophorone diisocyanate is equally important as a suitable aliphatic cyclic diisocyanate compound.

The monocyclic diisocyanates may be reacted with a wide variety of polyhydric alcohols. Aliphatic alcohols containing from 2 to 6 preferably from 2 to 4 hydroxyl moieties per molecule are suitable for use in this stage. Although both primary and secondary alcohols may be used, secondary alcohols are preferred.

In more specific but still general terms, the polyhydric alcohols should be selected from at least one of: $C_{2-5}$ diols; $C_{3-6}$ triols; $C_{4-8}$ tetraols; OH-functional polyesters having a number-average molecular weight of about 200 to 10,000, preferably about 1,000 to 5,000; or OH-functional polyethers having a number-average molecular weight of about 100 to 10,000, preferably about 1,000 to 5,000.

It is possible in particular to use the reaction products of low molecular weight polyhydric alcohols with $C_{1-4}$ alkylene oxides. For example, the reaction products of ethylene glycol, propylene glycol, of the isomeric butane diols or hexane diols with ethylene oxide, propylene oxide and/or butene oxide are suitable. The reaction products of trihydric alcohols, such as glycerol, trimethylol ethane and/or trimethylol propane, or higher alcohols, such as for example pentaerythritol, or sugar alcohols, with the above alkene oxides may also be used.

Polyether polyols having a number average molecular weight of from 100 to 10,000 and preferably from 1,000 to 5,000 are especially suitable, polypropylene glycol being particularly preferred.

Thus, it is possible, depending on the required molecular weight, to use adducts of only a few mols of ethylene oxide and/or propylene oxide per mol or of more than 100 mols of ethylene oxide and/or propylene oxide with low molecular weight polyhydric alcohols. Other suitable polyether polyols may be obtained by the condensation of glycerol or pentaerythritol with elimination of water. Polyols of the type commonly used in polyurethane chemistry can also be obtained by the polymerization of tetrahydrofuran. Of the polyether polyols mentioned above, the reaction products of polyhydric low molecular weight alcohols with propylene oxide under conditions where at least same secondary hydroxyl moieties are formed are particularly suitable. Other suitable polyether polyols are described, for example, in German Patent Application No. 25 59 759 and corresponding U.S. Pat. No. 4,111,865.

Polyester polyols having a number average molecular weight of from 200 to 10,000 are also suitable for reaction with monocyclic, asymmetrical diisocyanates. In a first embodiment, it is possible to use polyester polyols of the type obtained by reacting low molecular weight alcohols, particularly ethylene glycol, propylene glycol, glycerol or trimethylol propane, with 1 to 50 mols of caprolactone. Other suitable polyester polyols can be obtained by polycondensation. Thus, dihydric and/or trihydric alcohols may be condensed with an excess of dicarboxylic acids and/or tricarboxylic acids or reactive derivatives thereof to form polyester polyols. Dicarboxylic acids suitable for this purpose are succinic acid and its higher homologs containing up to 12 carbon atoms, unsaturated dicarboxylic acids, such as maleic acid or fumaric acid, and also aromatic dicarboxylic acids, particularly the isomeric phthalic acids. Suitable tricarboxylic acids include citric acid or trimellitic acid. Polyester polyols of the above dicarboxylic acids and glycerol, which have a residual content of secondary OH moieties, are particularly suitable for the purposes of the invention.

To obtain reaction products of monocyclic diisocyanates with polyhydric alcohols, which may be used in accordance with the invention as solvent or "reactive diluent" in the second stage of the reaction, it is important to maintain a certain ratio between hydroxyl moieties and isocyanate moieties. Thus, suitable first stage prepolymers which still contain free OH moieties after the more reactive NCO moieties have reacted off are formed when the ratio of OH moieties to isocyanate moieties is adjusted to 0.55–4:1, preferably 0.6–1:1.

To carry out the second stage of the process according to the invention, symmetrical dicyclic diisocyanates are reacted with the remaining OH moieties in the OH- and NCO-functional first stage prepolymer, which functions as a reactive diluent. The quantity in which the dicyclic diisocyantes are used, based on the total quantity of diisocyanates in both stages, amounts to between 5 and 80% by weight, preferably to between 5 and 60% by weight and more preferably to between 10 and 40% by weight. For the second stage of the reaction, the molar ratio of first stage prepolymer free OH moieties to second category isocyanate NCO moieties is 0.5–1:1, preferably 0.6–0.8:1.

An important factor in the selection of the dicyclic diisocyanates is that the reactivity of their isocyanate moieties to hydroxyl moieties should be higher than that of the terminal (i.e. free) isocyanate moieties of the reactive diluent. Thus, diaryl diisocyanates are primarily suitable. 4,4-diphenylmethane diisocyanate and/or substituted 4,4-diphenylmethane diisocyanates are preferred. Somewhat less suitable, but still useful, is 4,4-dicyclohexylmethane diisocyanate which may be formally regarded as the hydrogenation product of the former.

In the practical application of the process according to the invention, it is preferred to carry out the reaction of the diisocyanates with polyhydric alcohols at elevated temperature. Suitable temperatures are from 40° to 100° C., preferably from 80° to 95° C. In the laboratory (batches of approx. 1 kg), a reaction time of about 1 hour has proved to be advantageous for the first stage of the reaction and a reaction time of 2 to 20 hours for the second stage of the reaction, the temperature amounting to around 80° C. In either case, the reaction is over when there is no further reduction in the number of isocyanate moieties. This may be analytically determined by titrating the isocyanate moieties and is the case, for example, after 2 to 5 days at room temperature.

The products obtained by the process according to the invention show a substantially reduced content of free, monomeric monocyclic diisocyanates and of free, monomeric dicyclic diisocyanates. Thus, when the prepolymers are used over large areas at elevated temperatures, i.e. from about 80° to 100° C., no inconvenience is caused by volatile monocyclic diisocyanates. Another advantage of the products obtained by the process according to the invention lies in their relatively low viscosity which makes them suitable for solvent free adhesive applications.

The prepolymers according to the invention may be used either as such or in solution in organic solvents and/or standard accelerators for bonding plastics and, more particularly, for laminating plastic films. Such bonding may be conducted at temperatures of 70° to 120° C. To this end, it is possible to add the usual hardeners, for example polyhydric alcohols of relatively high molecular weight (2-component systems) and/or, directly to bond surfaces having a defined moisture content using the products according to the invention. Laminated films produced with the products according to the invention are safe to heat seal. This is possibly attributable to the reduced content of migratable low molecular weight products in the prepolymers.

EXAMPLES

EXAMPLE 1

In a three-necked flask equipped with a stirrer, thermometer and drying tube, 411.7 g of a polypropylene glycol (OH number 109 mg KOH/g) were mixed with 104.4 g of 2,4-tolylene diisocyanate (TDI) and the resulting mixture heated while stirring. Beyond the melt temperature of 90° C., an NCO titration value of 4.56%, considerably below the theoretical value of 4.88%, was reached after 30 minutes. Following the addition of 25 g of 4,4-diphenylmethane diisocyanate (MDI), the mixture was stirred for 2 hours at 90° C., after which the NCO-content reached 4.61% (theoretical 4.65%).
% monomeric TDI: 0.085
% monomeric MDI: 1.
Viscosity: 1510 mPas/60° C.
OH:NCO (1)=1:1.5
OH:NCO (2)=1:1, based on OH remaining from stage 1

EXAMPLE 2

In the same apparatus as in Example 1, the same quantity of the same polyether was reacted with 69.6 g of tolylene diisocyanate. After 1 hour (including heating-up time) at a reaction temperature of 85° C., the titrated NCO-content at 3.41% was close to the theoretical value of 3.48%. After the addition of 80 g of MDI and stirring, the mixture was left standing overnight in a drying cabinet at 60° C.
% monomeric TDI: 0.03
% monomeric MDI: 2.5
Viscosity: 1980 mPas/60° C.
% NCO=4.7 (theoretical 4.77)
OH:NCO (1)=1:1
OH:NCO (2)=1:1.6, based on OH remaining from stage 1

EXAMPLE 3

In the same way as in Examples 1 and 2, the same quantity of the same polyether was reacted with 87 g of 2,4-tolylene diisocyanate. After about 1.25 hours (including heating-up time) at 60° to 70° C., 50 g of MDI were added at 4.5% NCO (4.2%), the addition reaction continued for 2 hours at 70° C. and the reaction mixture left standing overnight. % NCO=4.59 (4.58).
% monomeric TDI: 0.08
% monomeric MDI: 1.5
Viscosity: 1390 mPas/60° C.
OH:NCO (1)=1:1.25
OH:NCO (2)=1:1.333, based on remaining OH The process according to the invention may be applied not only to polyethers, but also to polyesters, in which case the higher reactivity of the primary OH moieties necessitates the application of mild conditions to extend the period to include the first reaction stage.

Additional diisocyanates of the first category useful in this invention are:
cumene-2,4-diisocyanate.

Additional diisocyanates of the second category useful in this invention are:
4,4'-diisocyanato-3,3'-dimethoxybiephenyl.

I claim:
1. An isocyanate terminated polyurethane prepolymer having a low content of free isocyanate residual monomers which is the reaction product of

(A) a low viscosity first stage prepolymer having free NCO moieties and free OH moieties which is itself the reaction product of
  (a) a first diisocyanate containing NCO moieties of differing reactivity and
  (b) a polyhydric alcohol, in an OH:NCO ratio of about 0.55–4:1, so that only the more reactive NCO moieties are reacted with some of the OH moieties; and
(B) a second diisocyanate containing NCO moieties which are more reactive than the less reactive NCO moieties of the first diisocyanate, in an OH:NCO ratio of from equimolar to an excess of NCO, so that the NCO moieties of said second diisocyanate react with said remaining free OH moieties of said first stage prepolymer, to form said isocyanate terminated polyurethane prepolymer.

2. The polyurethane prepolymer of claim 1 wherein said first diisocyanate is an aliphatic and/or aromatic asymmetrical diisocyanate.

3. The polyurethane prepolymer of claim 2 wherein said first diisocyanate is monocyclic.

4. The polyurethane prepolymer of claim 1 wherein said first diisocyanate is a tolylene diisocyanate, isophorone diisocyanate, or any mixture thereof.

5. The polyurethane prepolymer of claim 1 wherein said polyhydric alcohol is an aliphatic alcohol containing from 2 to 6 hydroxyl moieties.

6. The polyurethane prepolymer of claim 1 wherein said polyhydric alcohol is a primary or secondary aliphatic alcohol containing from 2 to 4 hydroxyl groups.

7. The polyurethane prepolymer of claim 1 wherein said polyhydric alcohol is selected from at least one of: $C_{2-5}$ diols; $C_{3-6}$ triols; $C_{4-8}$ tetraols; OH-functional polyesters having a number-average molecular weight of about 200 to 10,000; or OH-functional polyethers having a number-average molecular weight of about 100 to 10,000.

8. The polyurethane prepolymer of claim 1 wherein said polyhydric alcohol is a polypropylene glycol.

9. The polyurethane prepolymer of claim 1 wherein said second diisocyanate is an aliphatic and/or aromatic symmetrical diisocyanate.

10. The polyurethane prepolymer of claim 9 wherein said second diisocyanate is dicyclic.

11. The polyurethane prepolymer of claim 1 wherein said second diisocyanate is 4,4-diphenylmethane diisocyanate, 4,4-dicychlohexylmethane diisocyanate, or a mixture thereof.

12. The polyurethane prepolymer of claim 1 wherein:
said first diisocyanate is at least one aliphatic and/or aromatic asymmetrical monocyclic diisocyanate;
said polyhydric alcohol is at least one primary or secondary aliphatic alcohol containing from 2 to 6 hydroxyl moieties; and
said second diisocyanate is at least one aliphatic and/or aromatic symmetrical dicyclic diisocyanate.

13. The polyurethane prepolymer of claim 1 wherein:
said first diisocyanate is a tolylene diisocyanate, isophorone diisocyanate, or any mixture thereof;
said polyhydric alcohol is a polypropylene glycol; and
said second diisocyanate is 4,4-diphenylmethane diisocyanate, 4,4-dicyclohexylmethane diisocyanate, or a mixture thereof.

14. The polyurethane prepolymer of claim 1 wherein the OH:NCO ratio of polyhydric alcohol to first diisocyanate is about 0.6–1:1.

15. The polyurethane prepolymer of claim 1 wherein the OH:NCO ratio of first stage prepolymer to second diisocyanate is about 0.5:1:1.

16. The polyurethane prepolymer of claim 1 wherein the OH:NCO ratio of first stage prepolymer to second diisocyanate is about 0.6–0.8:1.

17. The polyurethane prepolymer of claim 12 wherein the OH:NCO ratio of polyhydric alcohol to first diisocyanate is about 0.6–1:1 and the OH:NCO ratio of first stage prepolymer to second diisocyanate is about 0.5–1:1.

18. The polyurethane prepolymer of claim 13 wherein the OH:NCO ratio of polyhydric alcohol to first diisocyanate is about 0.6–1:1 and the OH:NCO ratio of first stage prepolymer to second diisocyanate is about 0.6–0.8:1.

19. In an adhesive composition for bonding plastics, comprising a polyurethane prepolymer and at least one of a hardener, moisture, organic solvent, or an accelerator, the improvement wherein said polyurethane prepolymer has a low content of free isocyanate residual monomers and comprises the reaction product of
(A) a low viscosity first stage prepolymer having free NCO moieties and free OH moieties which is itself the reaction product of
  (a) a first diisocyanate containing NCO moieties of differing reactivity and
  (b) a polyhydric alcohol, in an OH:NCO ratio of about 0.55–4:1, so that only the more reactive NCO moieties are reacted with some of the OH moieties; and
(B) a second diisocyanate containing NCO moieties which are more reactive than the less reactive NCO moieties of the first diisocyanate,
in an OH:NCO ratio of from equimolar to an excess of NCO, so that the NCO moieties of said second diisocyanate react with said remaining free OH moieties of said first stage prepolymer.

20. The adhesive composition of claim 19 wherein, in said polyurethane prepolymer:
said first diisocyanate is at least one aliphatic and/or aromatic asymmetrical monocyclic diisocyanate;
said polyhydric alcohol is at least one primary or secondary aliphatic alcohol containing from 2 to 6 hydroxyl moieties; and
said second diisocyanate is at least one aliphatic and/or aromatic symmetrical dicyclic diisocyanate.

21. The adhesive composition of claim 20 wherein, in said polyurethane prepolymer the OH:NCO ratio of polyhydric alcohol to first diisocyanate is about 0.6–1:1 and the OH:NCO ratio of first stage prepolymer to second diisocyanate is about 0.5–1:1.

22. A process for synthesizing an isocyanate terminated polyurethane prepolymer having a low content of free isocyanate residual monomers, comprising reacting:
(A) a low viscosity first stage prepolymer having free NCO moieties and free OH moieties which is itself synthesized by reacting:
  (a) a first diisocyanate containing NCO moieties of differing reactivity with
  (b) a polyhydric alcohol, in an OH:NCO ratio of about 0.55–4:1, so that only the more reactive NCO moieties are reacted with some of the OH moieties; with
(B) a second diisocyanate containing NCO moieties which are more reactive than the less reactive NCO moieties of the first diisocyanate, in an OH:NCO ratio of from equimolar to an excess of NCO, so that the NCO moieties of said second diisocyanate react with said remaining free OH moieties of said first stage prepolymer, and form said isocyanate terminated polyurethane prepolymer.

23. The process of claim 22 wherein:
said first diisocyanate is at least one aliphatic and/or aromatic asymmetrical monocyclic diisocyanate;
said polyhydric alcohol is at least one primary or secondary aliphatic alcohol containing from 2 to 6 hydroxyl moieties; and
said second diisocyanate is at least one aliphatic and/or aromatic symmetrical dicyclic diisocyanate.

24. The process of claim 23 wherein the OH:NCO ratio of polyhydric alcohol to first diisocyanate is about 0.6-1:1 and the OH:NCO ratio of first stage prepolymer to second diisocyanate is about 0.5-1:1.

25. The process of claim 22 wherein both stages of the synthesis are conducted at temperatures of about 40° to 100° C.

26. The process of claim 22 wherein both stages of the synthesis are conducted at temperatures of about 80° to 95° C.

* * * * *